United States Patent
Shea et al.

(10) Patent No.: US 10,334,968 B2
(45) Date of Patent: Jul. 2, 2019

(54) BRACKET ASSEMBLIES FOR SIGNAGE SYSTEMS AND MERCHANDISING DISPLAY SYSTEMS

(71) Applicant: T.M. SHEA PRODUCTS, INC., Troy, MI (US)

(72) Inventors: Thomas M. Shea, Troy, MI (US); Thomas J. Shea, Troy, MI (US); Lucas M. Shea, Troy, MI (US)

(73) Assignee: T.M. Shea Products, Inc., Troy, MI (US)

( * ) Notice: Subject to any disclaimer, the term of this patent is extended or adjusted under 35 U.S.C. 154(b) by 0 days.

(21) Appl. No.: 15/258,105

(22) Filed: Sep. 7, 2016

(65) Prior Publication Data

US 2018/0064265 A1    Mar. 8, 2018

(51) Int. Cl.
| | | |
|---|---|---|
| *A47F 5/08* | (2006.01) | |
| *G09F 7/08* | (2006.01) | |
| *G09F 7/18* | (2006.01) | |
| *F16B 47/00* | (2006.01) | |

(52) U.S. Cl.
CPC .......... *A47F 5/0823* (2013.01); *A47F 5/0815* (2013.01); *A47F 5/0869* (2013.01); *G09F 7/08* (2013.01); *G09F 7/18* (2013.01); *F16B 47/00* (2013.01); *G09F 2007/1847* (2013.01); *G09F 2007/1852* (2013.01)

(58) Field of Classification Search
CPC . G09F 7/18; G09F 3/204; G09F 15/00; G09F 23/06; G09F 7/00; G09F 15/0025; G09F 13/04; G09F 13/0413; G09F 15/0018; G09F 19/22; G09F 1/06; G09F 15/0037

USPC ............................. 40/597; 248/220.22–220.41
See application file for complete search history.

(56) References Cited

U.S. PATENT DOCUMENTS

| 2,118,135 | A | * | 5/1938 | Baldwin | G09F 1/14 40/603 |
|---|---|---|---|---|---|
| 2,965,978 | A | * | 12/1960 | Olson | G09B 1/08 116/306 |
| 4,179,138 | A | * | 12/1979 | Bogdanovic | G09F 1/06 248/222.12 |
| 4,982,848 | A | * | 1/1991 | Church | A47F 5/0068 211/128.1 |
| D317,944 | S | * | 7/1991 | George | D20/42 |
| 5,237,767 | A | * | 8/1993 | Kringel | G09F 3/204 248/231.41 |
| 5,346,166 | A | * | 9/1994 | Valiulis | A47F 5/0068 211/57.1 |
| 5,415,370 | A | * | 5/1995 | Valiulis | A47F 5/0006 211/57.1 |
| 5,465,516 | A | * | 11/1995 | Stabile | G09F 3/204 248/220.22 |
| 5,467,545 | A | * | 11/1995 | Zillner | G09F 7/12 40/597 |
| 5,678,699 | A | * | 10/1997 | Gebka | A47F 5/0068 211/113 |

(Continued)

Primary Examiner — Shin H Kim
(74) Attorney, Agent, or Firm — Stephen T. Olson; Harness, Dickey & Pierce, P.L.C.

(57) ABSTRACT

A bracket assembly for one of a signage system and a merchandising display system. The bracket assembly includes a base element, at least one securing element and a mounting element. The at least one securing element is carried by the base element. The mounting element is carried by the base element and releasably engages one of a sign and a merchandising display panel.

9 Claims, 12 Drawing Sheets

(56) References Cited

U.S. PATENT DOCUMENTS

| | | | | |
|---|---|---|---|---|
| 5,881,481 A * | 3/1999 | Bashaw, Jr. | ............. | G09F 21/04 116/173 |
| 6,015,124 A * | 1/2000 | Loy | ............. | A47F 5/0815 248/220.31 |
| 6,082,687 A * | 7/2000 | Kump | ............. | A47F 5/0068 211/57.1 |
| 6,220,461 B1 * | 4/2001 | Dickinson | ............. | A47B 57/045 108/108 |
| 6,234,330 B1 * | 5/2001 | Gray | ............. | A47F 5/0838 211/103 |
| 6,318,684 B1 * | 11/2001 | Ireland | ............. | A47F 5/0068 108/77 |
| D454,918 S * | 3/2002 | Wamsley | ............. | D20/43 |
| 6,536,613 B2 * | 3/2003 | Shea | ............. | A47F 5/0006 211/87.01 |
| 6,644,606 B1 * | 11/2003 | Seidel | ............. | G09F 7/18 248/220.41 |
| 6,698,124 B2 * | 3/2004 | Kump | ............. | A47F 5/0823 248/220.41 |
| 7,100,878 B2 * | 9/2006 | Shea | ............. | A47F 5/0807 211/90.02 |
| 7,121,416 B2 * | 10/2006 | Shea | ............. | A47F 5/0807 211/113 |
| 7,891,617 B2 * | 2/2011 | Tisbo | ............. | F16B 12/34 248/220.22 |
| 8,308,880 B2 * | 11/2012 | White | ............. | B23P 19/00 156/60 |
| 8,776,414 B2 * | 7/2014 | Clark | ............. | G09F 15/00 108/107 |
| 9,060,624 B2 * | 6/2015 | Hardy | ............. | A47F 5/005 |
| 9,307,848 B2 * | 4/2016 | Bernstein | ............. | A47F 5/04 |
| D774,874 S * | 12/2016 | Wentzel | ............. | D8/349 |
| 2002/0007577 A1 * | 1/2002 | Padiak | ............. | G09F 7/18 40/606.14 |
| 2002/0020095 A1 * | 2/2002 | Kump | ............. | A47F 5/0823 40/657 |
| 2003/0074820 A1 * | 4/2003 | Fink | ............. | G09F 7/00 40/597 |
| 2003/0164346 A1 * | 9/2003 | Shea | ............. | A47F 5/0823 211/59.1 |
| 2005/0252053 A1 * | 11/2005 | Pena | ............. | G09F 21/04 40/591 |
| 2006/0130381 A1 * | 6/2006 | Caterinacci | ............. | G09F 7/20 40/607.04 |
| 2008/0282587 A1 * | 11/2008 | Pender | ............. | G09F 7/00 40/124.06 |
| 2009/0056185 A1 * | 3/2009 | Wamsley | ............. | G09F 7/00 40/611.12 |
| 2009/0211123 A1 * | 8/2009 | Arnold | ............. | B43L 1/00 40/1 |
| 2009/0321595 A1 * | 12/2009 | Conway | ............. | G09F 3/204 248/205.3 |
| 2011/0132854 A1 * | 6/2011 | Berdahl | ............. | A47F 3/12 211/59.2 |
| 2011/0214324 A1 * | 9/2011 | White | ............. | B23P 19/00 40/611.06 |

* cited by examiner

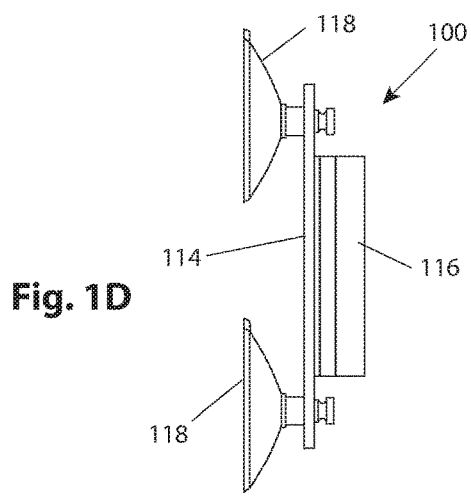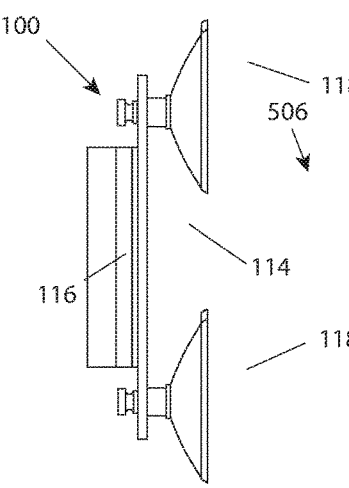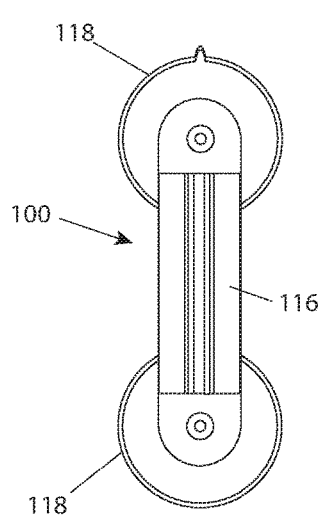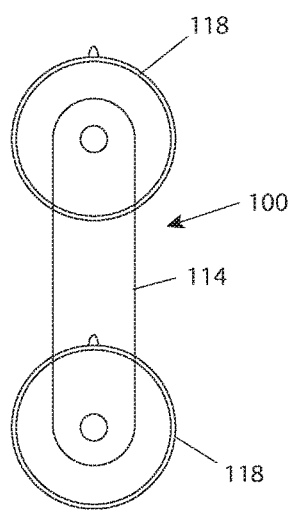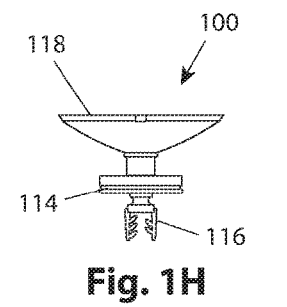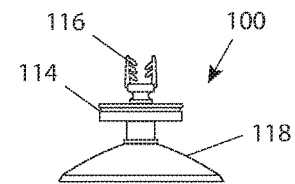

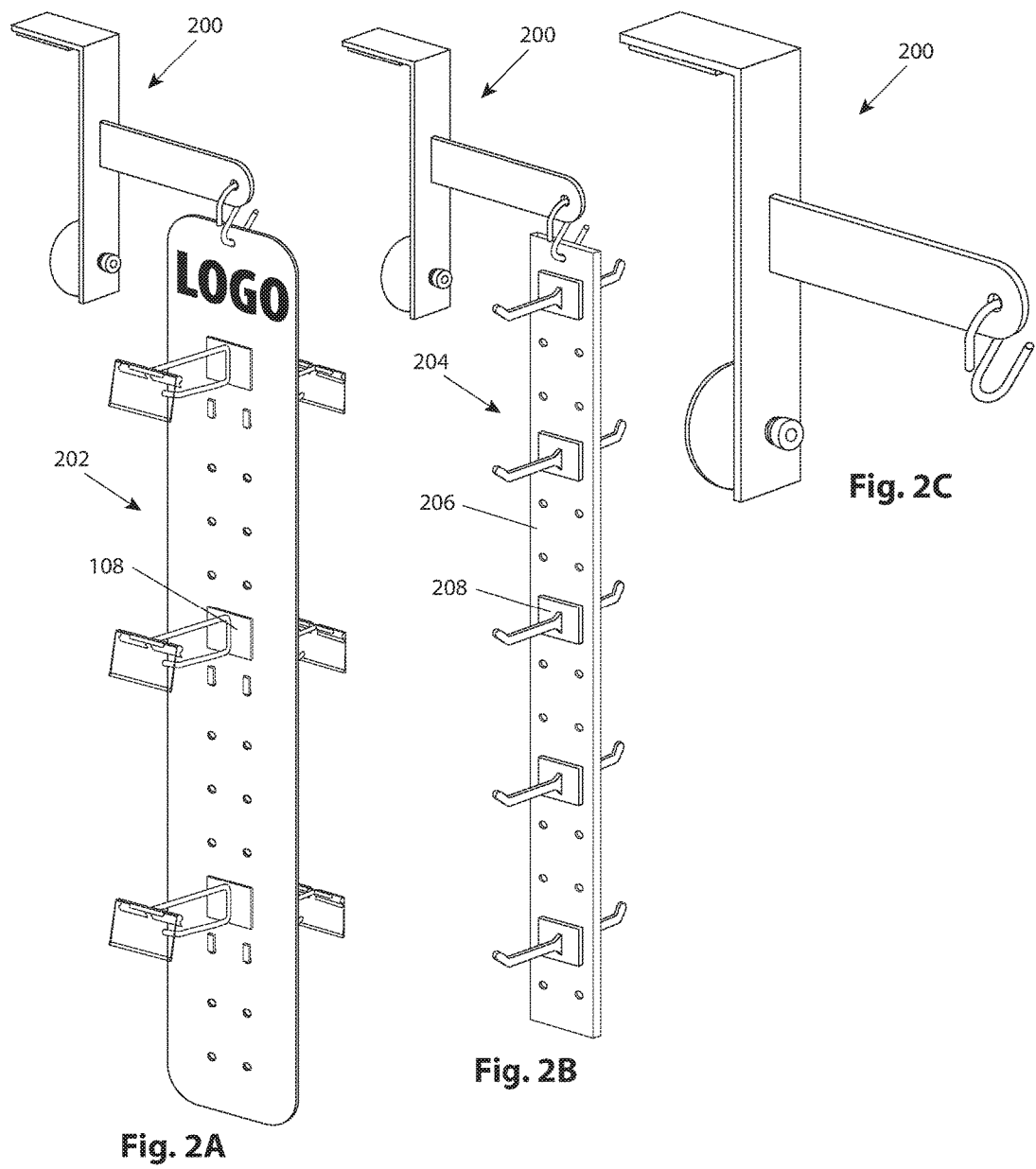

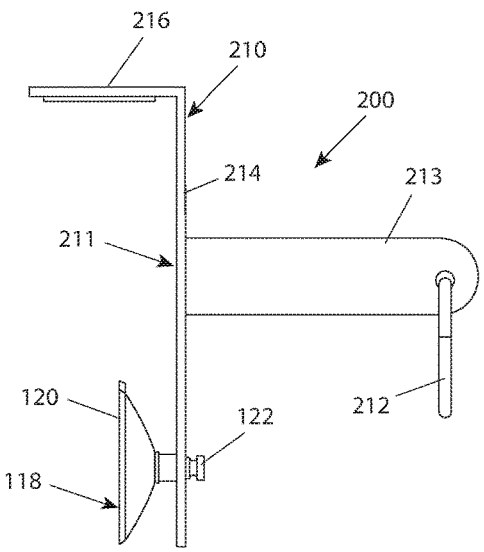
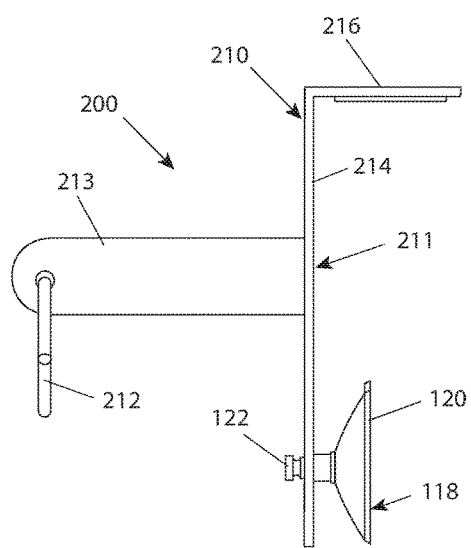
Fig. 2D  Fig. 2E
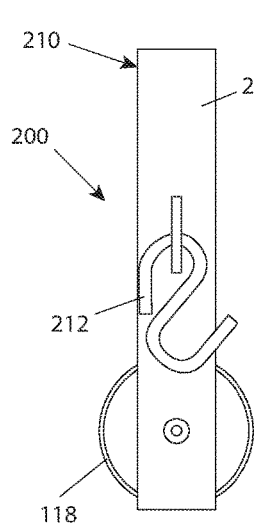 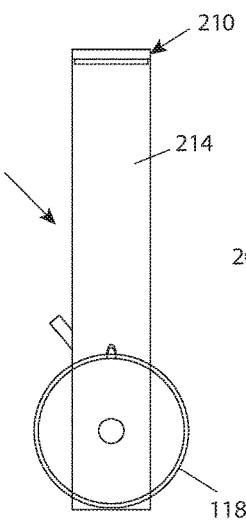 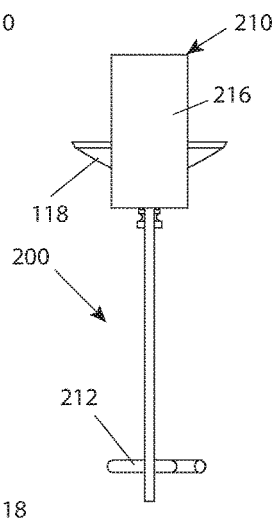 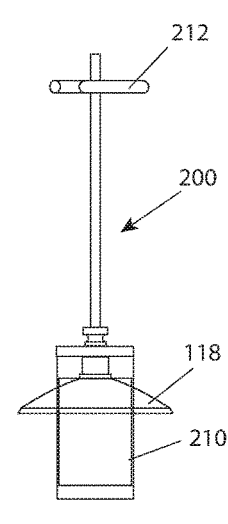
Fig. 2F  Fig. 2G  Fig. 2H  Fig. 2I

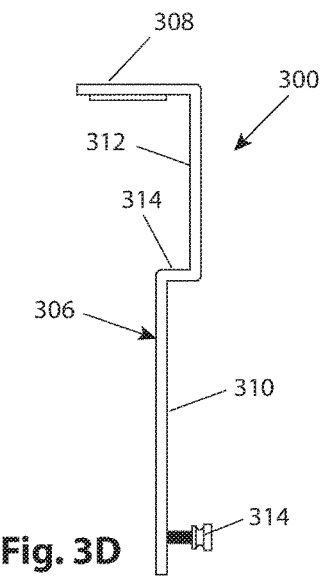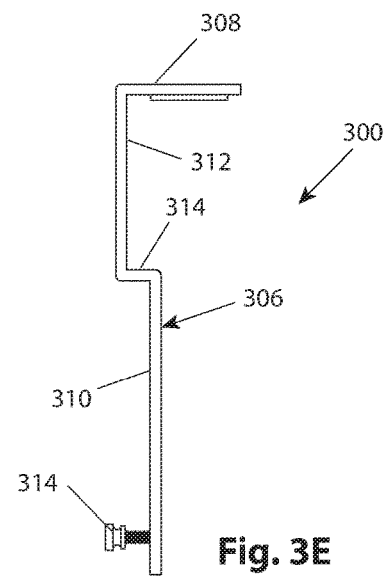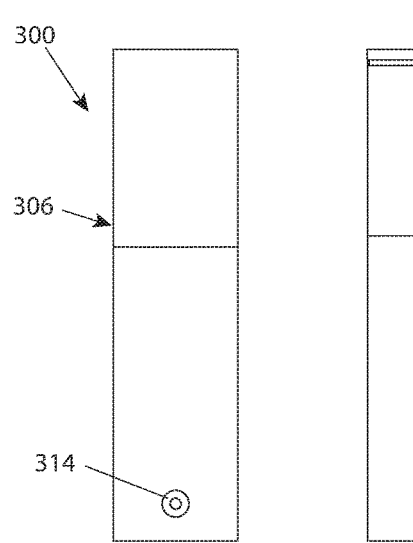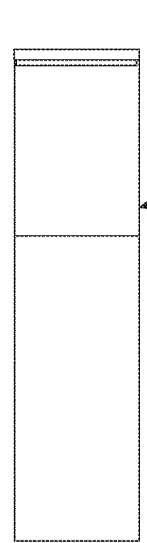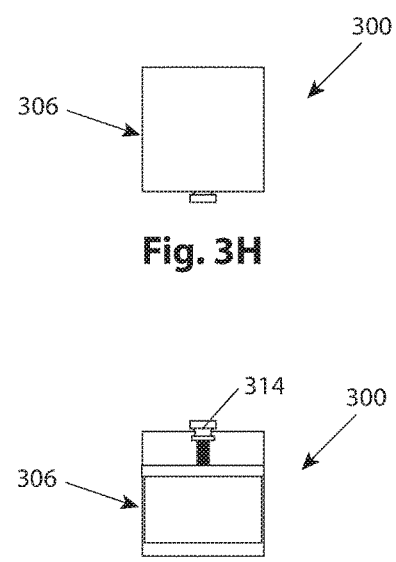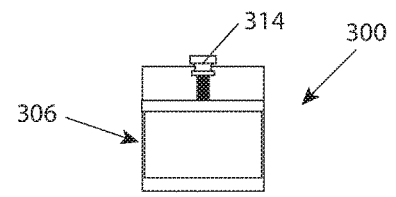

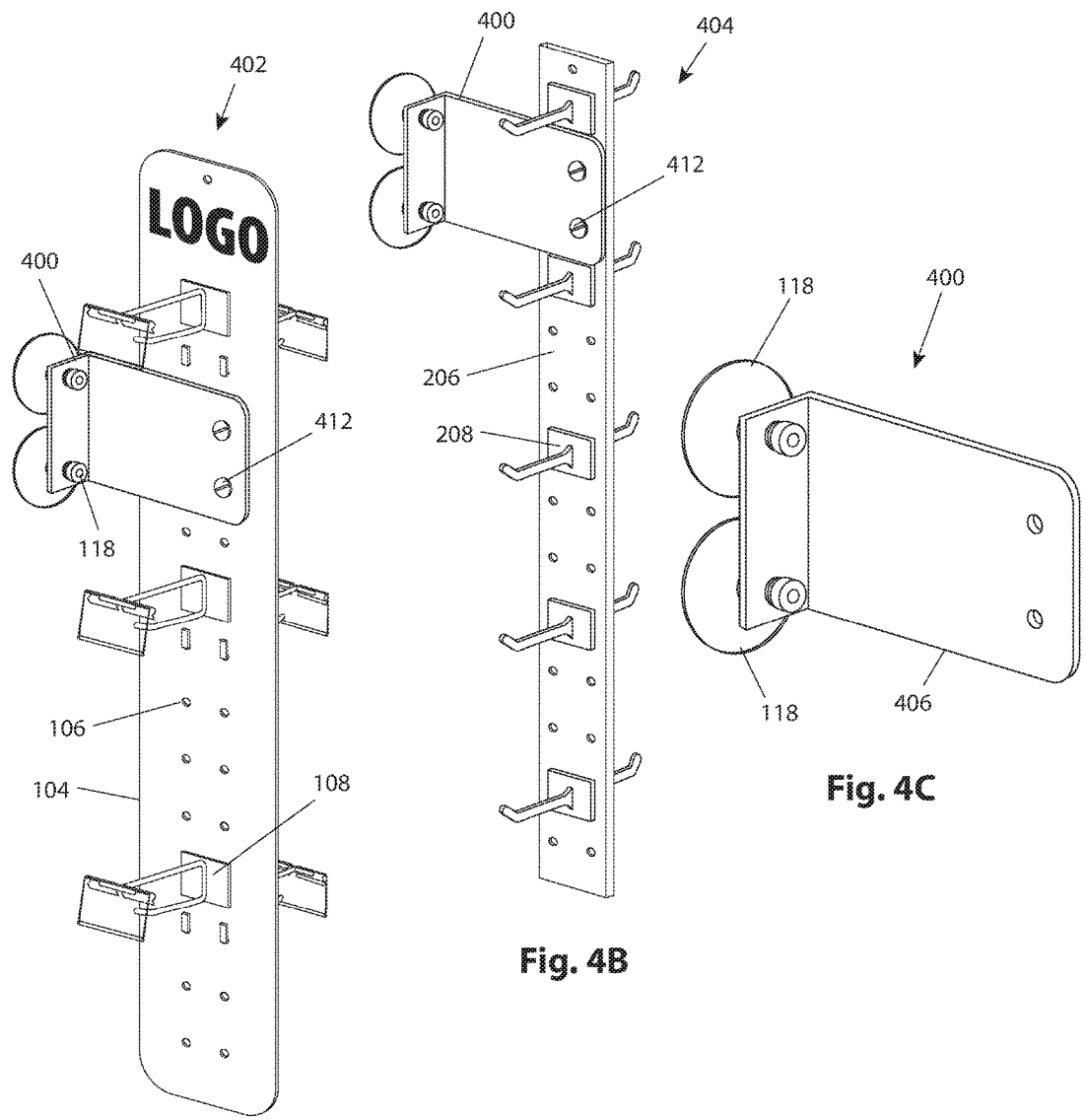

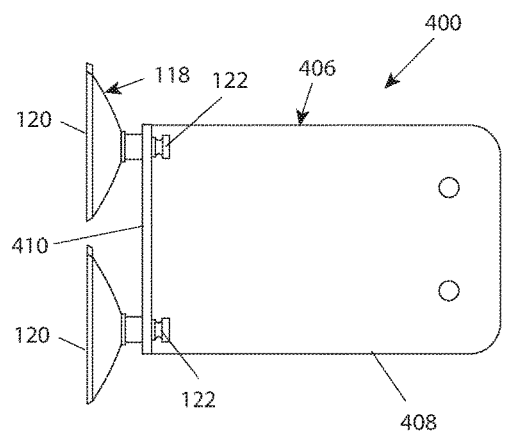
Fig. 4D
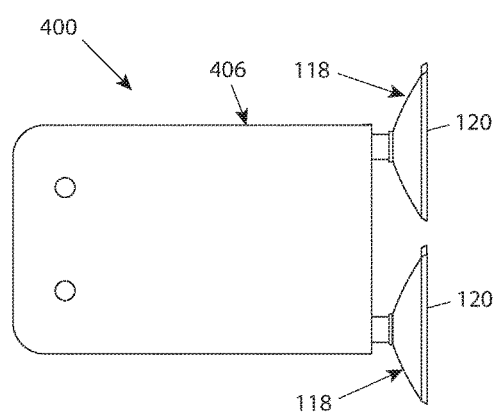
Fig. 4E
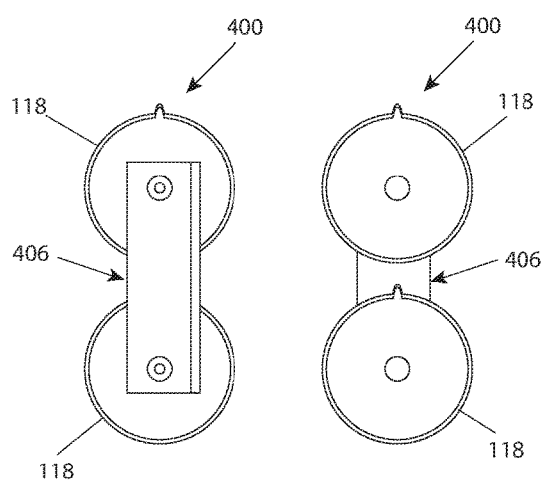
Fig. 4F
Fig. 4G
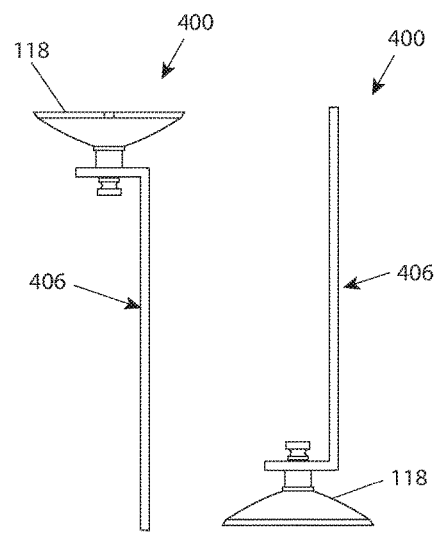
Fig. 4H
Fig. 4I

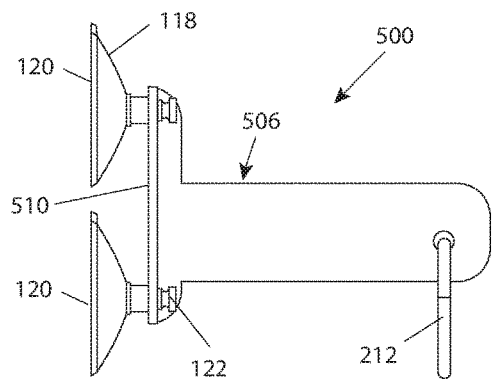
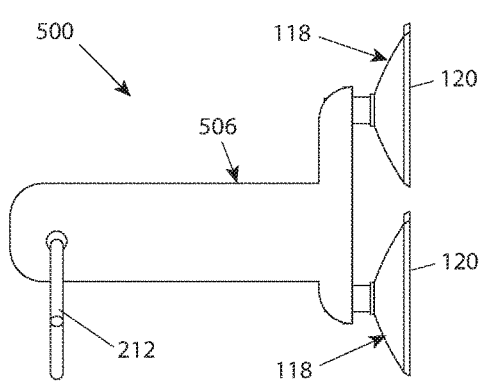
Fig. 5D    Fig. 5E
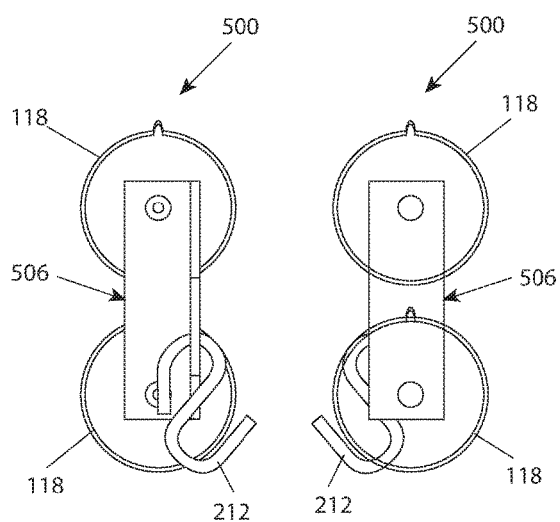
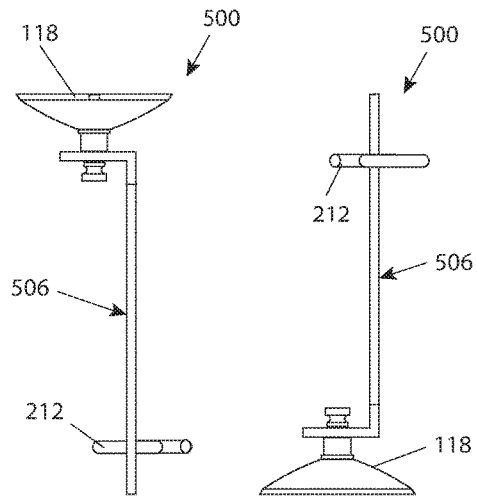
Fig. 5F    Fig. 5G    Fig. 5H    Fig. 5I

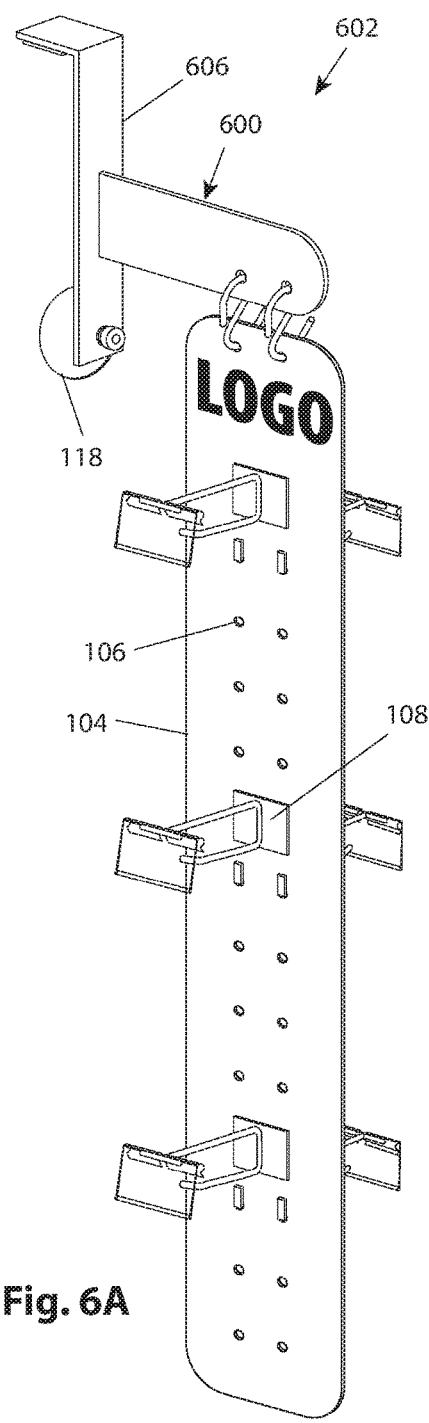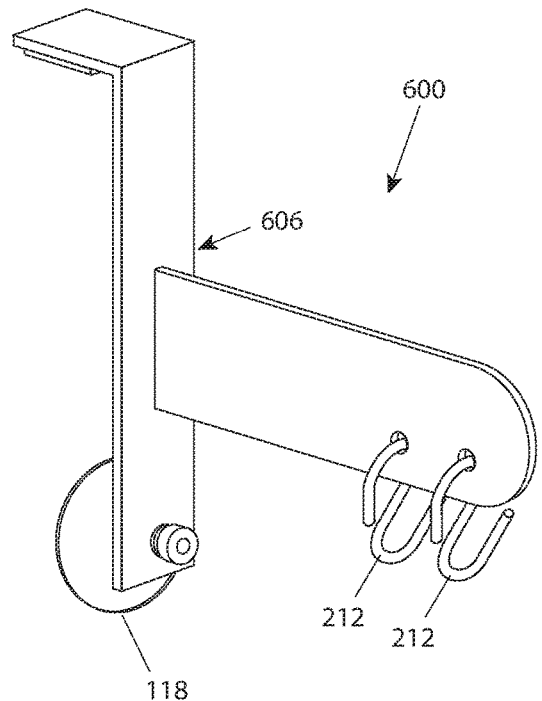
Fig. 6A
Fig. 6B

BRACKET ASSEMBLIES FOR SIGNAGE SYSTEMS AND MERCHANDISING DISPLAY SYSTEMS

FIELD

The present teachings generally relate to retail signage systems and merchandising display assemblies. More particularly, the present teachings relate to bracket assemblies for signage systems and merchandising display systems.

DISCUSSION

A multitude of product and product categories crowd the aisles and merchandise displays of retail stores. Signage systems can be used to showcase products or product categories, attract attention and provide guidance to different sections of the store. For example, various signage systems are shown and described in commonly owned U.S. Publication No. 2012/0240436, U.S. Publication No. 2012/0240436 is incorporated by reference as if fully disclosed herein.

Merchandising display assemblies can be used to more effectively position merchandise within the store. For example, one known merchandise display assembly is shown and described in commonly owned U.S. Pat. No. 5,957,422. U.S. Pat. No. 5,957,422 is incorporated by reference as if fully disclosed herein.

While existing signage systems and merchandising display assemblies have proven to be satisfactory for their intended purposes, there remains a need for continuous improvement within the relevant art.

SUMMARY

The present teachings provide various bracket assembly designs that can be used in connection with merchandising display assemblies and signage systems.

The present teachings provide various ornamental designs of bracket assemblies for signage systems and merchandising display systems.

The present teachings provide various bracket assemblies for signage systems and merchandising display systems having glass brackets.

In accordance with one particular aspect, the present teachings provide a bracket assembly for one of a signage system and a merchandising display system. The bracket assembly includes a base element, at least one securing element and a mounting element. The at least one securing element is carried by the base element. The mounting element is carried by the base element and releasably engages one of a sign and a merchandising display panel.

In accordance with another particular aspect, the present teachings provide a bracket assembly for suspending a merchandising display panel. The bracket assembly includes a base element, at least one securing element carried by the base element, and a mounting element. The mounting element is carried by the base element and engages a merchandising display panel.

In accordance with yet another particular aspect, the present teachings provide a bracket assembly for suspending a merchandising display panel. The bracket assembly includes a generally planar upper portion, a lower portion, a generally planar intermediate portion and a mounting member. The intermediate member interconnects the upper and lower portions. The generally planar upper portion and the generally planar intermediate portion cooperating to define an L-shape. The mounting member is carried by the lower portion and is for engaging the merchandising display panel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein:

FIG. 1D is right side view of the glass bracket assembly of FIG. 1C.

FIG. 1E is a left side view of the glass bracket assembly of FIG. 1C.

FIG. 1F is front view of the glass bracket assembly of FIG. 1C.

FIG. 1G is rear view of the glass bracket assembly of FIG. 1C.

FIG. 1H is top view of the glass bracket assembly of FIG. 1C.

FIG. 1I is bottom view of the glass bracket assembly of FIG. 1C.

FIG. 2A is a perspective view of a merchandising display system incorporating a glass bracket assembly in accordance with the present teachings.

FIG. 2B is perspective view of another merchandising display system incorporating the glass bracket assembly of FIG. 2A.

FIG. 2C is perspective view of the glass bracket assembly of FIGS. 2A and 2B.

FIG. 2D is right side view of the glass bracket assembly of FIG. 2C.

FIG. 2E is a left side view of the glass bracket assembly of FIG. 2C.

FIG. 2F is front view of the glass bracket assembly of FIG. 2C.

FIG. 2G is rear view of the glass bracket assembly of FIG. 2C.

FIG. 2H is top view of the glass bracket assembly of FIG. 2C.

FIG. 2I is bottom view of the glass bracket assembly of FIG. 2C.

FIG. 3D is right side view of the glass bracket assembly of FIG. 3C.

FIG. 3E is a left side view of the glass bracket assembly of FIG. 3C.

FIG. 3F is front view of the glass bracket assembly of FIG. 3C.

FIG. 3G is rear view of the glass bracket assembly of FIG. 3C.

FIG. 3H is top view of the glass bracket assembly of FIG. 3C.

FIG. 3I is bottom view of the glass bracket assembly of FIG. 3C.

FIG. 4A is a perspective view of a merchandising display system incorporating a glass bracket assembly in accordance with the present teachings.

FIG. 4B is perspective view of another merchandising display system incorporating the glass bracket assembly of FIG. 4A.

FIG. 4C is perspective view of the glass bracket assembly of FIGS. 4A and 4B.

FIG. 4D is right side view of the glass bracket assembly of FIG. 4C.

FIG. 4E is a left side view of the glass bracket assembly of FIG. 4C.

FIG. 4F is front view of the glass bracket assembly of FIG. 4C.

FIG. 4G is rear view of the glass bracket assembly of FIG. 4C.

FIG. 4H is top view of the glass bracket assembly of FIG. 4C.

FIG. 4I is bottom view of the glass bracket assembly of FIG. 4C.

FIG. 5D is right side view of the glass bracket assembly of FIG. 5C.

FIG. 5E is a left side view of the glass bracket assembly of FIG. 5C.

FIG. 5F is front view of the glass bracket assembly of FIG. 5C.

FIG. 5G is rear view of the glass bracket assembly of FIG. 5C.

FIG. 5H is top view of the glass bracket assembly of FIG. 5C.

FIG. 5I is bottom view of the glass bracket assembly of FIG. 5C.

FIG. 6A is a perspective view of a merchandising display system incorporating a glass bracket assembly in accordance with the present teachings.

FIG. 6B is perspective view of the glass bracket assembly of FIG. 6A.

It will be understood that the various embodiments shown throughout the application are drawn to scale. Like reference characters have been used throughout the various views to identify like elements.

DESCRIPTION OF VARIOUS ASPECTS

Figure 1A:
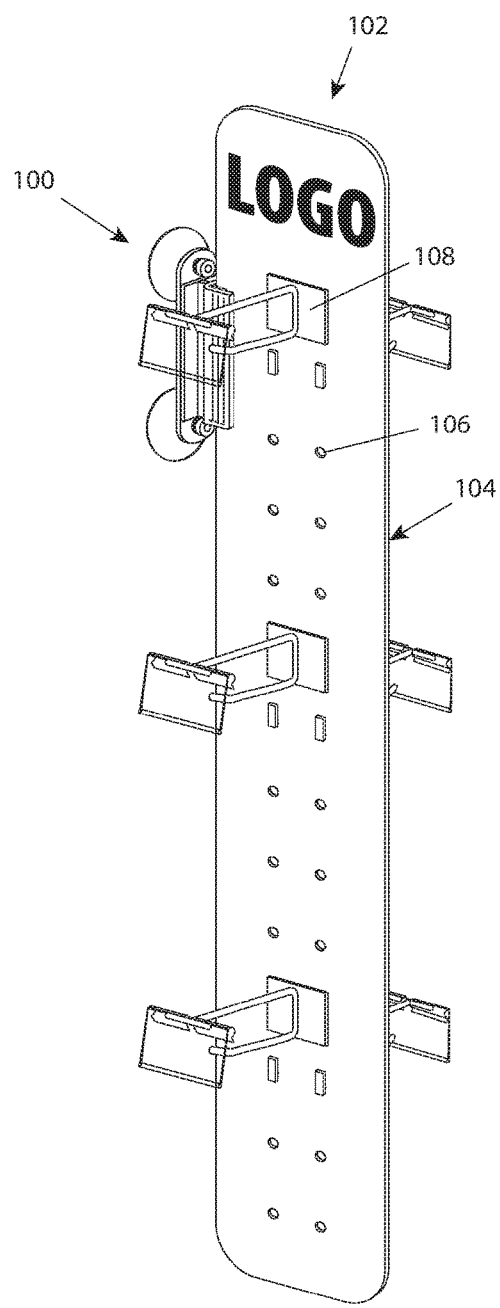
FIG. 1A is a perspective view of a merchandising display system incorporating a glass bracket assembly in accordance with the present teachings.

The following description is merely exemplary in nature and is in no way intended to limit the invention, its application, or uses.

With initial reference to FIGS. 1A-1I, a glass bracket assembly constructed in accordance with the present teachings is illustrated and generally identified at reference character 100. In the embodiment illustrated, the bracket assembly 100 is a glass bracket assembly. As used herein, it will be understood that the term "glass bracket assembly" is intended to refer to one particular intended use of the bracket assembly 100 (and other reference numbers introduced below in connection with the other embodiments). It will be further understood, however, that the glass bracket assemblies described herein may be removable secured to other surfaces within the scope of the present teachings.

In FIG. 1A, the glass bracket assembly 100 is shown incorporated into a merchandising display system 102 for the suspension of product for retail sale. The merchandising display system 102 is further shown to generally include a panel 104 that may be constructed of a flexible plastic material, cardboard or other suitable material. The panel 104 may include a plurality of apertures 106 for conventional engagement with a bracket 108 for the display of retail product. It will be understood that the elements of the merchandising display system 102 other than the glass bracket assembly 100 are conventional insofar as the present invention is concerned to the extent not otherwise described here. In this regard, the glass bracket assembly 100 may be incorporated into other merchandising display systems within the scope of the present teachings.

Figure 1B:
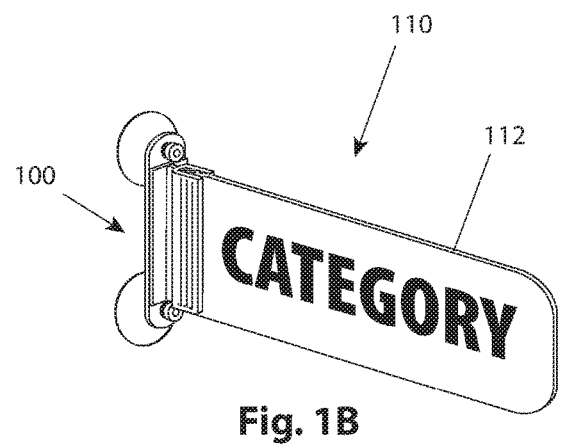
FIG. 1B is perspective view of a signage system incorporating the glass bracket assembly of FIG. 1A.
Figure 1C:
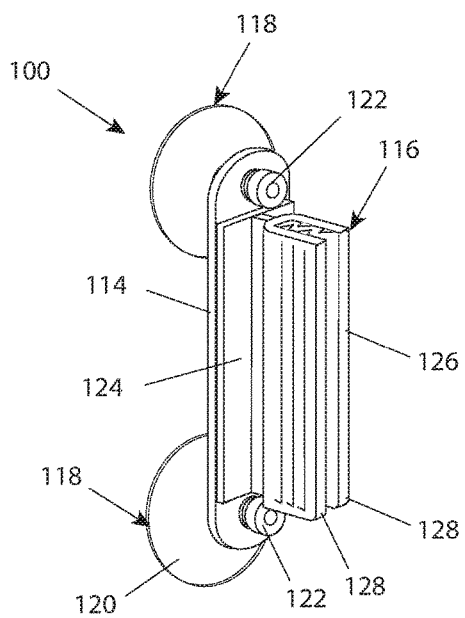
FIG. 1C is perspective view of the glass bracket assembly of FIGS. 1A and 1B.

In FIG. 1B, the glass bracket assembly 100 is shown incorporated into a signage system 110. The signage system 110 is further is further shown to include a panel 112 that may be constructed of a flexible plastic material, cardboard or other suitable material. The panel 112 may be sign printed with graphics or graphics may be otherwise suitably secured to the panel 112.

With particular reference to FIGS. 1C through 1I, the glass bracket assembly 100 is further illustrated. It will be understood that the left and right side views of FIGS. 1D and 1E are mirror images of one another.

The glass bracket assembly 100 is illustrated to generally include a base member 114, a mounting element 116 and one or more securing elements or members 118. The base member 114 may be generally planar and may be constructed of metal, plastic or other suitable material. The one or more securing elements 118 may include two securing elements. Each of the securing elements 118 may include a suction cup portion 120 and an attachment portion 122 extending through a hole in the base member 114. The suction cup portions 120 may be clear or translucent.

The mounting element 116 may be unitarily constructed to include first and second portions 124 and 126. The first portion 124 is for attachment to the base member 114. In this regard, the first portion 124 may be adhesively or otherwise suitably connected to the base member 114. The second portion 126 is for engaging a panel (e.g., 104 or 112). The second portion may be U-shaped including first and second arms 128. The first and second arms 128 may be formed to include teeth or other features on inner sides thereof for releasably engaging the panel.

Turning to FIGS. 2A through 2I, another glass bracket assembly constructed in accordance with the present teachings is illustrated and generally identified at reference character 200. In view of the similarities between embodiments, like reference characters will be used to identify like elements.

In FIG. 2A, the glass bracket assembly 200 is shown incorporated into a merchandising display system 202 for the suspension of product for retail sale. The merchandising display system 202 is further shown to generally include a panel 104 that may be constructed of a flexible plastic material, cardboard or other suitable material. The panel 104 may include a plurality of apertures 106 for conventional engagement with a bracket 108 for the display of retail product. In FIG. 2B, the glass bracket assembly 200 is shown incorporated into another merchandise display assembly 204 having an alternative panel 206 and alternative brackets 208. It will be understood that the elements of the merchandising display systems 202 and 204 other than the glass bracket assembly 200 are conventional insofar as the present invention is concerned to the extent not otherwise described here. In this regard, the glass bracket assembly 200 may be incorporated into other merchandising display systems within the scope of the present teachings.

With particular reference to FIGS. 2C through 2I, the glass bracket assembly 200 is further illustrated. It will be understood that the left and right side views of FIGS. 2D and 2E, respectively, are mirror images of one another.

The glass bracket assembly 200 is illustrated to generally include a base member 210, one or more securing elements or members 118 and a hook member 212. The base member 210 may include a first portion 211 and a second portion 213. The first portion 211 may be generally L-shaped and include a first arm 214 and a second arm 216. The first and second arms 214 and 216 may be generally planar. The second portion 213 may be generally planar and may extend from the first arm of the first portion 211. The second portion 213 may be welded or otherwise suitably secured to the first portion 211. The base member 210 may be constructed of metal, plastic or other suitable material.

The one or more securing elements or members 118 may include a single securing element 118. The securing elements 118 may include a suction cup portion 120 and an attachment portion 122 extending through a hole in the base member 210. The suction cup portion 120 may be clear or translucent.

The hook member 212 may be carried at a distal end of the second portion 213 of the base member 210. In this regard, the hook member 212 may include an upper portion for engaging a hole in the base member 210. The hook member 213 may further include a lower portion for engaging a hole in the panel.

Turning to FIGS. 3A through 3I, another bracket assembly constructed in accordance with the present teachings is illustrated and generally identified at reference character 300. In view of the similarities between embodiments, like reference characters will be used to identify like elements. In this particular embodiment, the bracket assembly 300 is not shown to include a securing element having a suction cup. It certain applications, however, it may be desirable to incorporate such a securing element.

Figure 3A:
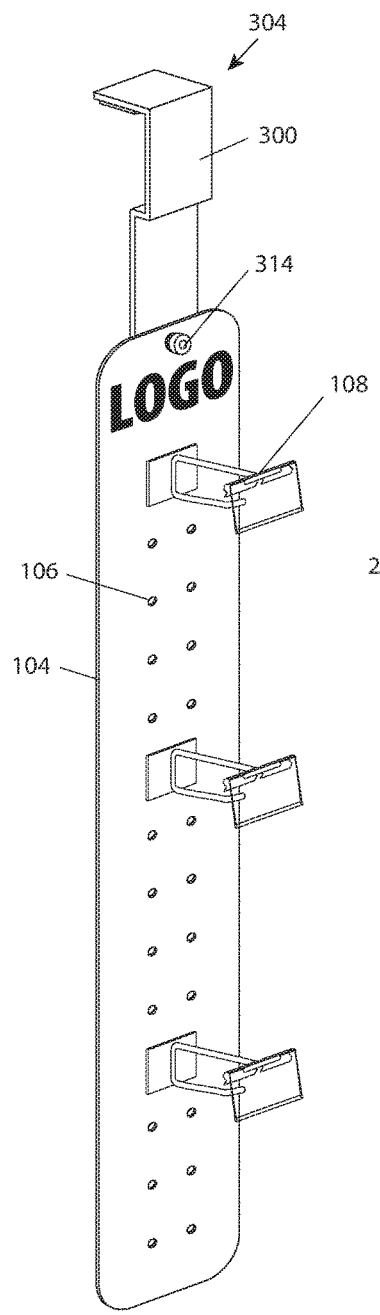
FIG. 3A is a perspective view of a merchandising display system incorporating a glass bracket assembly in accordance with the present teachings.
Figure 3B:
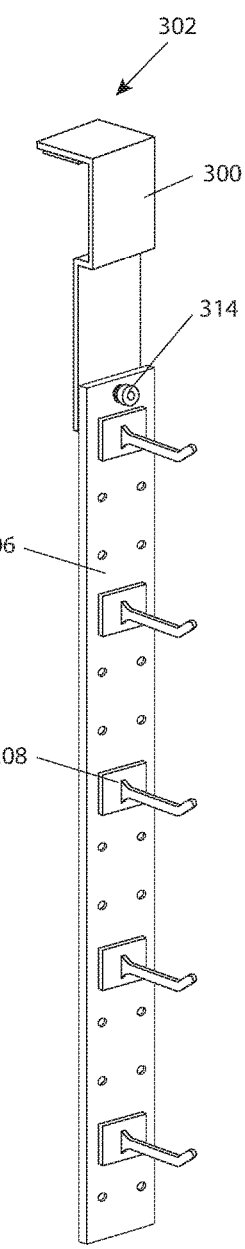
FIG. 3B is perspective view of another merchandising display system incorporating the glass bracket assembly of FIG. 3A.
Figure 3C:
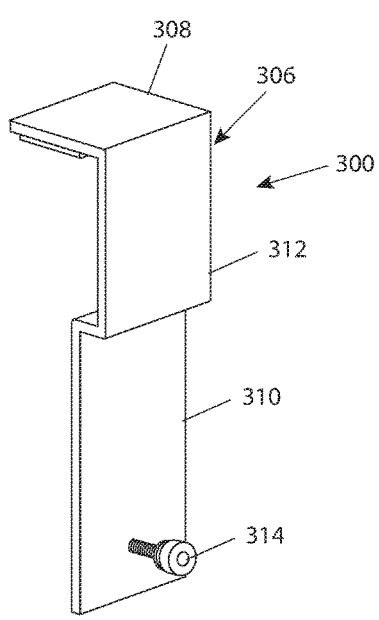
FIG. 3C is perspective view of the glass bracket assembly of FIGS. 3A and 3B.

In FIG. 3A, the bracket assembly 300 is shown incorporated into a merchandising display system 302 for the suspension of product for retail sale. The merchandising display system 302 is further shown to generally include a panel 104 that may be constructed of a flexible plastic material, cardboard or other suitable material. The panel 104 may include a plurality of apertures 106 for conventional engagement with a bracket 108 for the display of retail product. In FIG. 3B, the bracket assembly 300 is shown incorporated into another merchandise display assembly 304 having an alternative panel 206 and alternative brackets 208. It will be understood that the elements of the merchandising display systems 302 and 304 other than the glass bracket assembly 300 are conventional insofar as the present invention is concerned to the extent not otherwise described here. In this regard, the bracket assembly 300 may be incorporated into other merchandising display systems within the scope of the present teachings.

With particular reference to FIGS. 3C through 3I, the bracket assembly 300 is further illustrated. It will be understood that the left and right side views of FIGS. 3D and 3E, respectively, are mirror images of one another.

The bracket assembly 300 is illustrated to generally include a base member 306. The base member 306 may be unitarily formed of metal or other suitable material to include an upper portion 308, a lower portion 310 and an intermediate portion 312. The upper portion 310 and the intermediate portion 312 may be planar and may define an L-shape. The lower portion 310 and the intermediate portion 312 may be parallel to one another and interconnected by a step portion 314. The panel (e.g., 104 or 206) may be connected to the base member 304 by a fastener 316 passing through an aperture in the panel and engaging the base member 304 in a conventional manner. For example, the fastener 316 may threadably engage the base member 304.

Turning to FIGS. 4A through 4I, another bracket assembly constructed in accordance with the present teachings is illustrated and generally identified at reference character 400. In view of the similarities between embodiments, like reference characters will be used to identify like elements.

In FIG. 4A, the glass bracket assembly 400 is shown incorporated into a merchandising display system 402 for the suspension of product for retail sale. The merchandising display system 402 is further shown to generally include a panel 104 that may be constructed of a flexible plastic material, cardboard or other suitable material. The panel 104 may include a plurality of apertures 106 for conventional engagement with a bracket 108 for the display of retail product. In FIG. 4B, the glass bracket assembly 400 is shown incorporated into another merchandise display assembly 404 having an alternative panel 206 and alternative brackets 208. It will be understood that the elements of the merchandising display systems 202 and 204 other than the glass bracket assembly 400 are conventional insofar as the present invention is concerned to the extent not otherwise described here. In this regard, the glass bracket assembly 400 may be incorporated into other merchandising display systems within the scope of the present teachings.

With particular reference to FIGS. 4C through 4I, the glass bracket assembly 400 is further illustrated. It will be understood that the left and right side views of FIGS. 4D and 4E, respectively, are mirror images of one another.

The glass bracket assembly 400 is illustrated to generally include a base member 406 and one or more securing elements or members 118. The base member 406 may be generally L-shaped and include a first portion 408 and a second portion 410. The first and second portions 406 and 408 may be generally planar. The base member 406 may be constructed of metal, plastic or other suitable material. In one application, the base member 406 may be bent from a sheet of metal.

The one or more securing elements 118 may include a two securing elements 118. The securing elements 118 may include a suction cup portion 120 and an attachment portion 122 extending through a hole in the second portion 410 of base member 406. The suction cup portion 120 may be clear or translucent. The panel (e.g., 104 or 2016) may be connected to the base member 406 by a fasteners 412 passing through apertures in the panel and engaging the base member 406 in a conventional manner.

Turning to FIGS. 5A through 5I, another bracket assembly constructed in accordance with the present teachings is illustrated and generally identified at reference character 500. In view of the similarities between embodiments, like reference characters will be used to identify like elements.

Figure 5A:
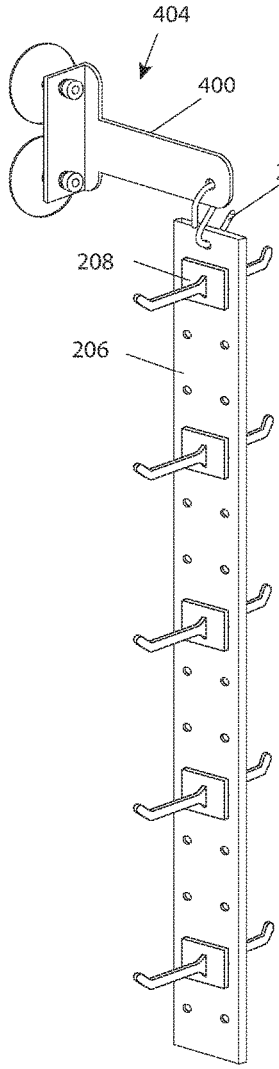
FIG. 5A is a perspective view of a merchandising display system incorporating a glass bracket assembly in accordance with the present teachings.
Figure 5B:
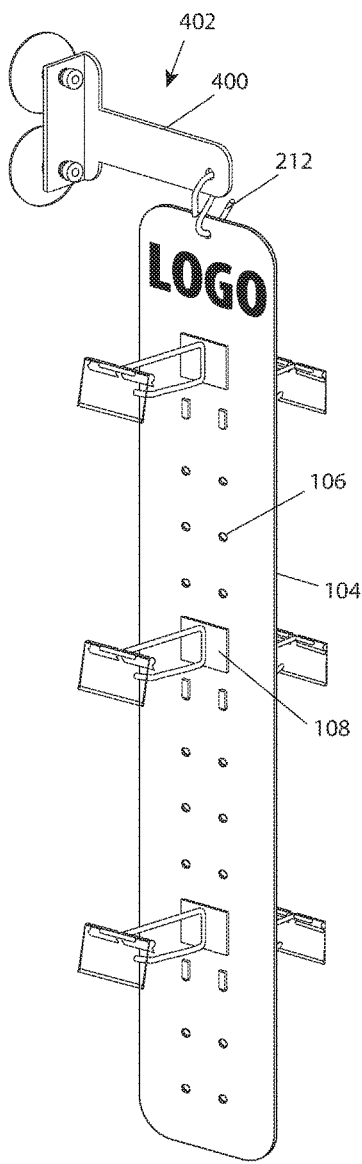
FIG. 5B is perspective view of another merchandising display system incorporating the glass bracket assembly of FIG. 5A.
Figure 5C:
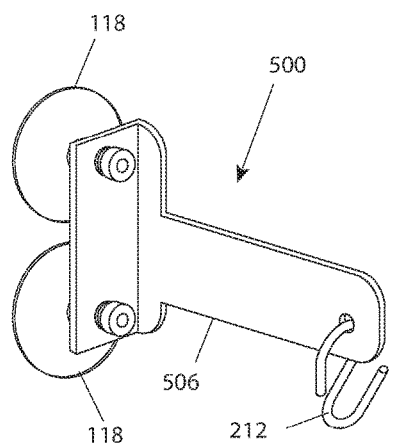
FIG. 5C is perspective view of the glass bracket assembly of FIGS. 5A and 5B.
Figure 6C:
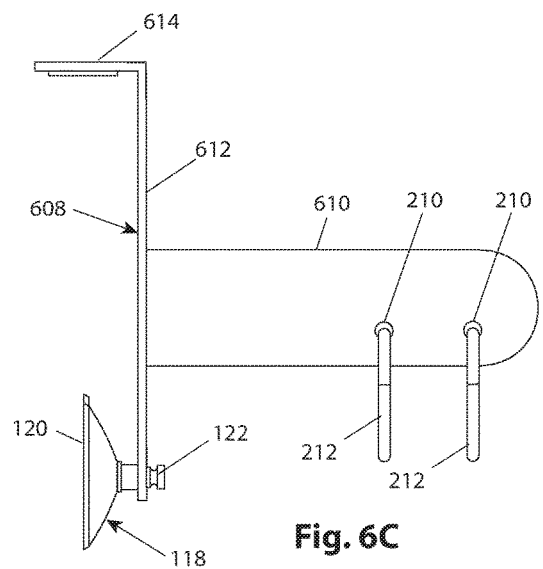
FIG. 6C is right side view of the glass bracket assembly of FIG. 6B.
Figure 6D:
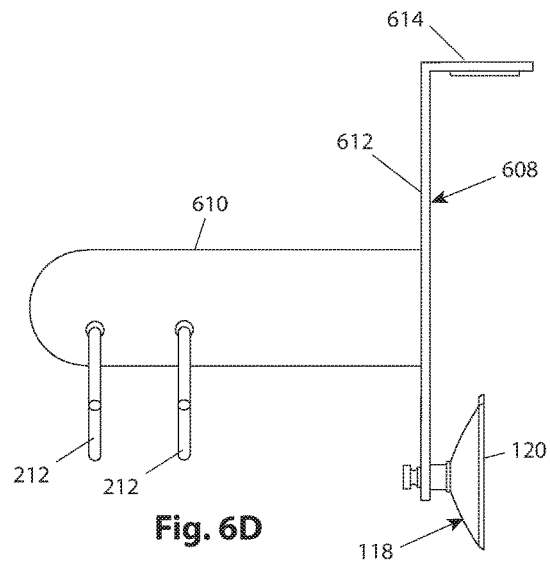
FIG. 6D is a left side view of the glass bracket assembly of FIG. 6B.
Figure 6E:
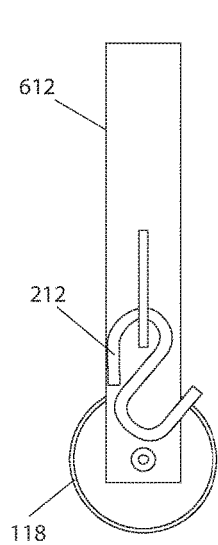
FIG. 6E is front view of the glass bracket assembly of FIG. 6B.
Figure 6F:
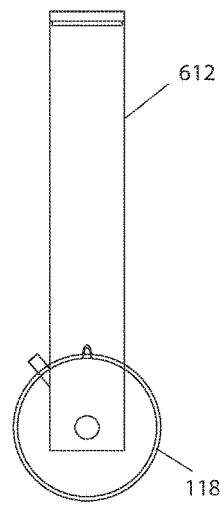
FIG. 6F is rear view of the glass bracket assembly of FIG. 6B.
Figure 6G:
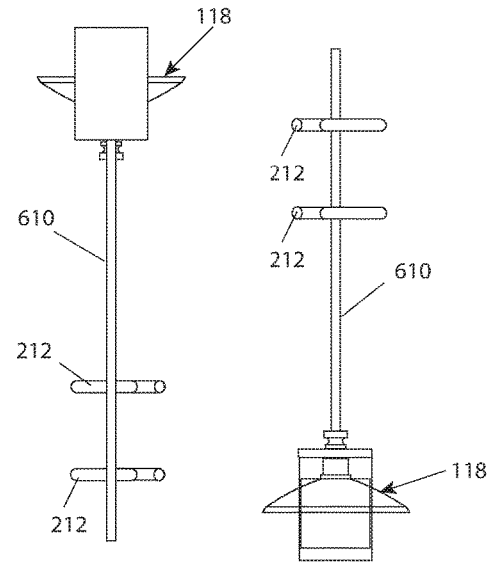
FIG. 6G is top view of the glass bracket assembly of FIG. 6B.
Figure 6H:
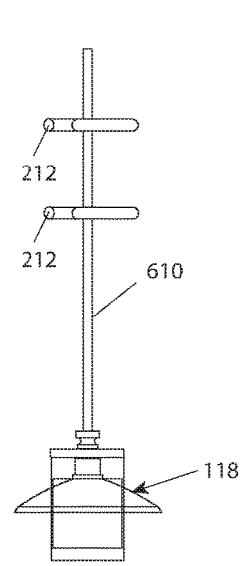
FIG. 6H is bottom view of the glass bracket assembly of FIG. 6B.

In FIG. 5A, the glass bracket assembly 500 is shown incorporated into a merchandising display system 502 for the suspension of product for retail sale. The merchandising display system 502 is further shown to generally include a panel 104 that may be constructed of a flexible plastic material, cardboard or other suitable material. The panel 104 may include a plurality of apertures 106 for conventional engagement with a bracket 108 for the display of retail product. In FIG. 5B, the glass bracket assembly 500 is shown incorporated into another merchandise display assembly 504 having an alternative panel 206 and alternative brackets 208. It will be understood that the elements of the merchandising display systems 502 and 504 other than the glass bracket assembly 500 are conventional insofar as the present invention is concerned to the extent not otherwise described here. In this regard, the glass bracket assembly 500 may be incorporated into other merchandising display systems within the scope of the present teachings.

With particular reference to FIGS. 5C through 5I, the glass bracket assembly 500 is further illustrated. It will be understood that the left and right side views of FIGS. 5D and 5E, respectively, are mirror images of one another.

The glass bracket assembly 500 is illustrated to generally include a base member 506, a hook member 212 and one or more securing elements or members 118. The base member 506 may be generally L-shaped and include a first portion 508 and a second portion 510. The first and second portions 506 and 508 may be generally planar. The base member 506 may be constructed of metal, plastic or other suitable material. In one application, the base member 506 may be bent from a sheet of metal.

The one or more securing elements 118 may include a two securing elements 118. The securing elements 118 may include a suction cup portion 120 and an attachment portion 122 extending through a hole in the second portion 510 of base member 506. The suction cup portion 120 may be clear or translucent.

The panel (e.g., 104 or 206) may be connected to the base member 506 by the hook member 212 The hook member 212 may be carried at a distal end of the second portion 510 of the base member 506. In this regard, the hook member 212 may include an upper portion for engaging a hole in the base member 210. The hook member 213 may further include a lower portion for engaging a hole in the panel.

Turning to FIGS. 6A through 6H, another bracket assembly constructed in accordance with the present teachings is illustrated and generally identified at reference character 600. In view of the similarities between embodiments, like reference characters will be used to identify like elements.

In FIG. 6A, the glass bracket assembly 600 is shown incorporated into a merchandising display system 602 for the suspension of product for retail sale. The merchandising display system 602 is further shown to generally include a panel 104 that may be constructed of a flexible plastic material, cardboard or other suitable material. The panel 104 may include a plurality of apertures 106 for conventional engagement with a bracket 108 for the display of retail product. It will be understood that the elements of the merchandising display system 602 other than the glass bracket assembly 600 are conventional insofar as the present invention is concerned to the extent not otherwise described here. In this regard, the glass bracket assembly 600 may be incorporated into other merchandising display systems within the scope of the present teachings.

With particular reference to FIGS. 6B through 6H, the glass bracket assembly 600 is further illustrated. It will be understood that the left and right side views of FIGS. 6C and 6D, respectively, are mirror images of one another.

The glass bracket assembly 600 is illustrated to generally include a base member 606, one or more securing members 118 and a pair of hook members 212. The base member 606 may include a first portion 608 and a second portion 610. The first portion 608 may be generally L-shaped and include a first arm 612 and a second arm 614. The first and second arms 612 and 614 may be generally planar. The second portion 610 may be generally planar and may extend from the first arm of the first portion 608. The second portion 610 may be welded or otherwise suitably secured to the first portion 608. The base member 606 may be constructed of metal, plastic or other suitable material.

The one or more securing elements 118 may include a single securing element 118. The securing elements 118 may include a suction cup portion 120 and an attachment portion 122 extending through a hole in the base member 210. The suction cup portion 120 may be clear or translucent.

The hook members 212 may be carried at a distal end of the second portion 610 of the base member 606. In this regard, the hook members 212 may include an upper portion for engaging a hole in the base member 210. The hook member 213 may further include a lower portion for engaging a respective hole in the panel.

While specific examples and alternatives have been described in the specification and illustrated in the drawings, it will be understood by those skilled in the art that various further changes may be made by and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A bracket assembly for suspending a merchandising display panel, the bracket assembly comprising:
   a generally L-shaped bracket having a first arm and a second arm, the first arm defining a planar base element;
   first and second securing elements including first and second suction cups, respectively, and first and second attachment portions, respectively, the first and second attachment portions passing through first and second holes, respectively, of the planar base element; and a planar mounting element defined by the second arm and carried by the base element, the planar mounting element engaging a planar merchandising display panel, the planar merchandising display panel perpendicular to the mounting element, wherein the first and second attachment portions extend parallel to the planar merchandising display panel, and wherein the planar merchandising display panel is flush against the second arm.

2. The bracket assembly of claim 1, wherein the base element includes a first portion and a second portion, the first portion being generally L-shaped and having a first arm and a second arm, the at least one securing element carried by the first arm, the second portion extending from the first portion and carrying the mounting element.

3. The bracket assembly of claim 2, wherein the mounting element is an S-shaped hook.

4. A bracket assembly for suspending a merchandising display panel in combination with the merchandising display panel, the bracket assembly comprising:

a generally planar upper portion;

a planar lower portion;

a generally planar intermediate portion interconnecting the upper and lower portions, the generally planar upper portion and the generally planar intermediate portion cooperating to define an L-shape;

a planar step portion interconnecting the intermediate and lower portions such that the intermediate and lower portions are parallel to one another; and at least one mounting member carried by the lower portion for engaging the merchandising display panel, wherein the merchandising display panel is planar and flush against the planar lower portion.

5. The bracket assembly of claim 4, in combination with the merchandising display panel, the merchandising display panel being planar, flush against the planar lower portion rearwardly disposed relative to the intermediate portion.

6. The bracket assembly of claim 1, wherein the first suction cup is attached at a lower end of the planar base element and the second suction cup is attached at a lower end of the planar base element.

7. The bracket assembly of claim 4, wherein the generally planar upper portion extends forwardly from a rear side to the intermediate portion and the step portion extends rearwardly from the intermediate portion to the lower portion.

8. The bracket assembly of claim 4, wherein each of the generally planar upper portion, the lower portion, the generally planar intermediate portion and the step portion is rectangular in shape.

9. The bracket assembly of claim 1, wherein the planar merchandising display panel is flush against the second arm.

\* \* \* \* \*